(12) United States Patent
Sharghi

(10) Patent No.: US 7,873,184 B2
(45) Date of Patent: Jan. 18, 2011

(54) METHOD FOR AUTOMARKING POSTAL MAIL

(75) Inventor: Sekhavat Sharghi, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 921 days.

(21) Appl. No.: 11/803,087

(22) Filed: May 11, 2007

(65) Prior Publication Data

US 2008/0000977 A1 Jan. 3, 2008

Related U.S. Application Data

(60) Provisional application No. 60/813,568, filed on Jun. 14, 2006.

(51) Int. Cl.
*G06K 9/00* (2006.01)
(52) U.S. Cl. ........................................ 382/101; 705/408
(58) Field of Classification Search ................. 382/101; 209/584, 900; 705/62, 402, 408, 410
See application file for complete search history.

(56) References Cited

U.S. PATENT DOCUMENTS

| 5,607,187 A | * | 3/1997 | Salive et al. | 283/67 |
| 5,617,481 A | * | 4/1997 | Nakamura | 382/101 |
| 2004/0125413 A1 | * | 7/2004 | Cordery | 358/3.28 |

\* cited by examiner

*Primary Examiner*—Andrew W Johns

(57) ABSTRACT

A method for automarking presorted postal mail includes scanning a mail piece in a first sorting pass at a presort facility and then printing an automark code on the mail piece indicating the type of postage applied. The automark code includes a horizontal line of seven consecutive characters improved in that one character, for example the fifth character, is a redundant code for one or more other characters representing postage type paid for the mail piece. To improve machine readability of the code, the line of characters may be printed with increased spacing between the fifth and sixth and/or between the sixth and seventh characters.

12 Claims, 2 Drawing Sheets

DJBF1P2        46517

Figure 2(a)

DJBF1 P2        46517

Figure 2(b)

DJBF1 P 2        46517

Figure 2(c)

DJBF1 P 2     46517

Figure 2(d)

DJBF1 P 2        46517

Figure 2(e)

METHOD FOR AUTOMARKING POSTAL MAIL

This application claims priority of U.S. Provisional Patent Application Ser. No. 60/813,568, filed Jun. 14, 2006.

TECHNICAL FIELD

The invention relates to sorting systems and methods used in mail processing facilities, especially by presort mailers.

BACKGROUND OF THE INVENTION

Pre-sort mailers typically perform automated processing of mail pieces for delivery to a customer. These mailers receive mail in batches from customers which they combine and sort in order to obtain postal discounts. Letter shops create mail and combine mail created for different customers using sorting machines in a manner similar to presort mailers. Both will be referred to as "pre-sorters" in the discussion below. Sorting machines used by pre-sorters are similar to those used at the USPS, namely DBCS and MLOCR machines. These businesses provide a service to their customers by processing items according to standard USPS rules for automated mail handling. This processing in turn reduces the postage rate charged to the customer.

Kiani et al. U.S. Patent Publication 20060080266, Apr. 13, 2006, the contents of which are incorporated herein by reference, describes a system and method for the automatic detection of items as originating from a specific source, e.g. client or customer, identifying specific characteristics of the items, comparing these characteristics to a database of sets of such characteristics identified with or more sources, and providing an output of items that match the characteristics. In one embodiment, a mailer detection and manifest system detects mail pieces that were sent by specific mailers using mail piece characteristics that are unique to the mail pieces of each mailer's job within a mixed mailer mail stream. This is preferably accomplished in real-time or near real-time while sorting the mail pieces after the mailer's specific mail piece characteristics have been determined. The process is used by presorters that receive mail and presort it into batches before sending it to the USPS in order to obtain postage discounts based of the level to which the mail has been presorted.

Presorters commonly apply a special seven character automark code to each mail piece in order to facilitate the sorting process. As described in the Domestic Mail Manual (DMM) of the U.S. Postal Service, Section 5.3.2, the first character of the automark corresponds to a code for the month that the directory of recipient addresses used by the presorter was generated. The next three characters identify the "MASS" machine ID, "MASS" referencing the USPS's program for certification of presort systems. The fifth character is vendor defined, and has in one case been used in the past for the OCR used to obtain the bar code result.

At the time that the automark code is applied, the last two (sixth and seventh) digits of the code identify the proper postage related to the customer that submitted the mail piece. The last two characters of the automark on a mail piece are as follows: P1=Permit 1-ounce; P2=Permit 2-ounce; P3=Permit 3-ounce; P4=Permit 4-ounce; M3=Metered at the 3-Digit rate; M5=Metered at the 5-Digit rate; MA=Metered at the AADC rate; MM=Metered at the Mixed AADC rate; MILITARY PERSONNEL=Metered at the Basic rate; S1=Precanceled Stamp Rate 1; S2=Precanceled Stamp Rate 2; S3=Precanceled Stamp Rate 3. During subsequent sorting of the automarked mail piece at the presorter, the automark code will be read and used, among other things, to determine the total postage paid for a given batch of presorted mail.

It is common that a presorter will have multiple locations, and that the mail will be initially presorted at one location, then shipped elsewhere for presorting with other presort mail calculated to yield a greater postage discount when delivered to the USPS. For this purpose, automark code needs to be read at the remote location, but the read rate of such dot matrix automark codes is often poor. The present invention relates to a method for improving the readability of the automark code so that accurate tracking of total postage for a batch of presorted mail can be realized.

SUMMARY OF THE INVENTION

According to the invention, the automark code comprises a horizontal line of seven consecutive characters wherein one character is a redundant code for one or more characters representing postage type paid for the mail piece. For example, the fifth character may be the redundant code for a postage code indicated by the seventh and eighth characters. In order to improve the read rate of the automark code, the automark code may be printed with the spacing between the fifth and sixth characters and/or between the six and seventh characters greater than the spacing between the first five characters. These steps markedly improve the success rate for reading automarkings without requiring any change in the physical characteristics of the mail pieces and the markings thereon.

The invention further provides a method for determining the type of postage paid for a presorted mail piece including scanning a mail piece in a first sorting pass at a presort facility and then printing an automark code on the mail piece indicating the type of postage applied, which automark comprises a character code wherein one character is a redundant code for one or more characters representing postage type paid for the mail piece. In a subsequent sorting pass at a presort facility, the mail piece is scanned to read the automark code. The subsequent sorting pass may be at the same or a different presort facility than the presort facility that carried out the first sorting pass. In one variation, the subsequent presorting facility is at a different location from the first presorting facility and the method includes the further step of shipping a batch of presorted mail from the first facility to the subsequent facility. These and other aspects of the invention are discussed further in the detailed description that follows.

BRIEF DESCRIPTION OF THE DRAWINGS

In the accompanying drawings:

FIGS. 2(*a*)-2(*e*) are diagrams of automark and zip codes according to the invention with varying spacing.

DETAILED DESCRIPTION

Figure 1:
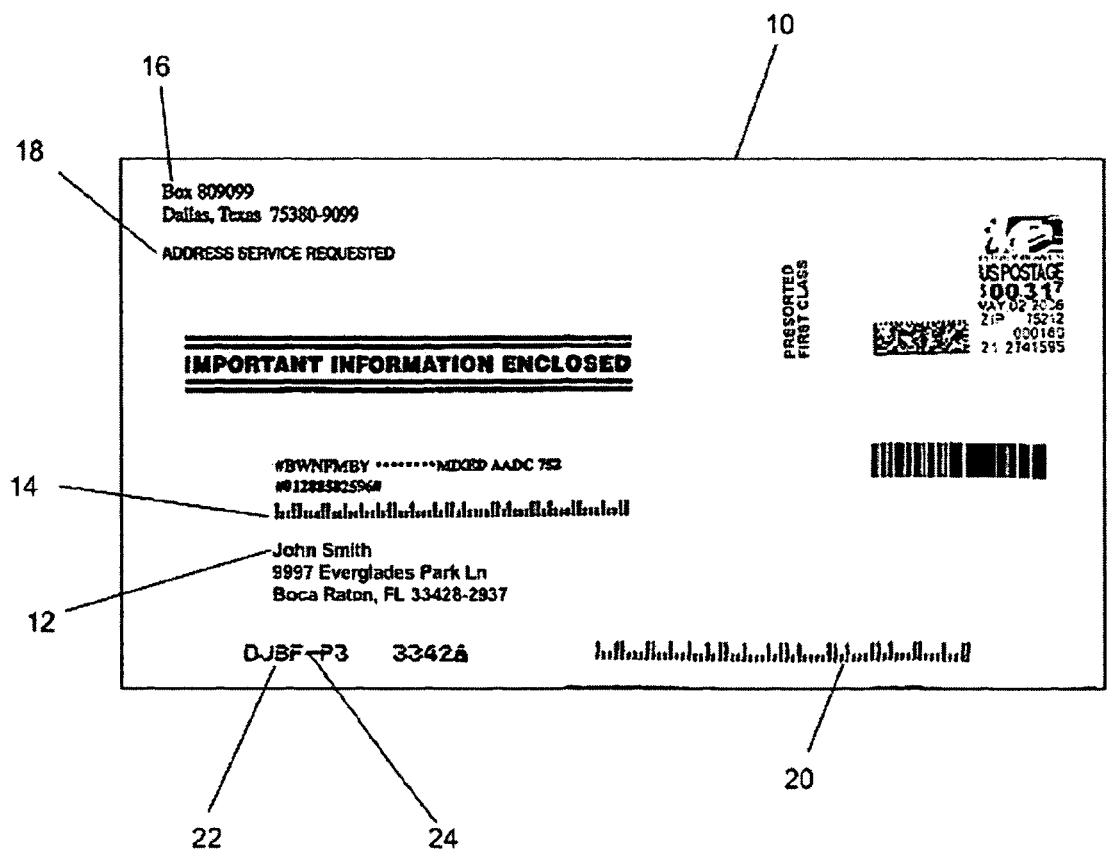
FIG. 1 is a front view of a mail piece marked with an automark code according to the invention.

As illustrated in FIG. 1, a presort mail piece 10 according to the invention includes features such as address 12, Planet bar code 14, return address 16, endorsement 18, Postnet bar code 20 and an automarking or automark code 22. Mail pieces 10 received by a presorter are initially scanned and sorted with a mail sorting machine and automark code is 22 is applied with a dot matrix printer. As illustrated, automark code 22 is a horizontal line of seven consecutive characters appearing in the lower left corner of mail piece 10.

The sorting system used by the presorter must determine from automark code 22 the postal category (metered, stamped or permit) and the postage rate that was used for the mailing. The software system used for reading the automarking, known as a classifier, must return these results to the sorting system where it can be counted towards a specific customer profile in the manner described in the Kiani et al. patent application cited above. The sorting system preferably should be able to accurately read automark 22 at an 85%+level of success.

The task of classifying the automark 22 can be added to an additional SSP style computer and carried out in tandem with the other processing steps described in the foregoing published application. The system reads the dot-matrix printed automark code 22 in the lower left or center of a presorted mail piece previously applied by the MLOCR sorter. Each of the automark identifiers must be successfully read and return a value to the system identifying the type of postage applied. This identifier must be accounted to a specific customer ID of the same type in order to submit proper reporting to the USPS for the mailing.

The process of the invention allows mail to be processed in a mailing at a city other than where the automark code was applied. When mail is moved between cities, it has already been sorted to specific zip level and is mixed with mail of varying postal types. The only way to correctly account for the postage is to read automark 22 applied when the mail piece was initially processed.

A control character 24 is used in the fifth position of the automark code 22 to better determine the rate marking. After analysis of the readability of the printed control characters, the following were selected as the control characters for the 5th position of automark code 22: P1=U, P2=1, P3=-, P4=H, M3=0, M5=^, MA=T, MM=7, MP=Y, S1=E, S2=A, S3=J. For example:

TABLE I

| | Position | | | | | | |
|---|---|---|---|---|---|---|---|
| | 1 | 2 | 3 | 4 | 5 | 6 | 7 |
| Automark Code | A | B | C | D | J | S | 3 |

Table I shows the control character Y in the 5th position of the automark code 22. This character is redundant with S3 (Precanceled Stamp Rate 3). In decoding automark 22, the system reads and assigns a read confidence interval to both the Y and the S3. Although one of these may result in a confidence level of only about 50%, taking the result of both J and S3 together results in a combined probability of accuracy that is much higher, preferably 85% or higher as noted above.

A preferred character set according to the invention for identification with postage class are U, 1, -, H, 0, ^, T, 7, Y, E, A, and J. The invention is not limited to the preferred set, and other alphanumeric and punctuation characters can be used. These characters are significantly easier to distinguish than others when printed with a dot matrix printer at the spacing used in automarking. Both alphanumeric and punctuation characters are "characters" for purposes of the invention, whereas bars used in bar codes are not "characters" for this purpose. Since the invention depends on use of the fifth character that is vendor-defined, and presorters often use machines from two or more different vendors, it is important that all of the vendors program their sorting systems to use the fifth character in a uniform manner as described herein.

Providing extra spaces between the characters of the automark is another way to improve the readability of printed characters that tend to run together when closely spaced. However, increasing the character spacing for the entire automark code makes the code too long for short mail pieces. On the other hand, putting an extra space between the 5th and 6th characters and one between the 6th and 7th makes these characters easier to read separate from each other and thus greatly improves read rate. See FIGS. 2(a)-2(c). It is possible to remove space between the last (7th) character and the dot-matrix printed bar code in the lower right corner of a presorted mail piece to compensate for the added space between the automark characters; compare FIG. 2(d) with 2(c). The increased spacing could be less than a full space for the font in which the automarking was printed (FIG. 2(e)).

These and other aspects of the invention are expressed in the claims that follow. While this invention has been described with reference to illustrative embodiments, this description is not intended to be construed in a limiting sense. Various modifications and combinations of the illustrative embodiments will be apparent to persons skilled in the art upon reference to the description. Such variations and additions are specifically contemplated to be with the scope of the invention. It is intended that the appended claims encompass any such modifications or embodiments.

The invention claimed is:

1. A method for determining type of postage paid for a presorted mail piece, comprising:
   in a first sorting pass at a presort facility, scanning a mail piece to determine the type of postage applied to the mail piece, and then printing an automark code on the mail piece indicating the type of postage applied, which automark comprises a character code wherein one character is a redundant code for one or more characters representing postage type paid for the mail piece;
   then in a subsequent sorting pass at a presort facility which may be the same or different from the one that carried out the first sorting pass, scanning the mail piece to read the automark thereon, and
   then determining the postage type for the mail piece by computing the read accuracy probabilities of the characters representing postage type and the character representing the redundant code, and combining the results in a manner effective to determine the postage type.

2. The method of claim 1, wherein the subsequent presorting facility is at a different location from the first presorting facility, further comprising a step of shipping a batch of presorted mail from the first facility to the subsequent facility.

3. The method of claim 1, wherein the automarking comprises a horizontal line of seven consecutive characters.

4. The method of claim 3, wherein the fifth character is the redundant code for a postage code indicated by the sixth and seventh characters.

5. The method of claim 4, wherein the spacing between the fifth and sixth characters is greater than the spacing between the first five characters.

6. The method of claim 5, wherein the spacing between the sixth and seventh characters is greater than the spacing between the first five characters.

7. A postal mail piece having an automark thereon comprising a series of printed characters, improved in one character is a redundant code for one or more characters representing postage type paid for the mail piece.

8. The mail piece of claim 7, wherein the automark code is printed with a dot matrix printer at a lower left corner of the mail piece below a printed address.

9. The mail piece of claim 8, wherein the automarking comprises a horizontal line of seven consecutive characters.

10. The mail piece of claim 9, wherein the fifth character is the redundant code for a postage code indicated by the sixth and seventh characters.

11. The mail piece of claim 8, wherein the spacing between the fifth and sixth characters is greater than the spacing between the first five characters.

12. The mail piece of claim 11, wherein the spacing between the sixth and seventh characters is greater than the spacing between the first five characters.

\* \* \* \* \*